United States Patent [19]

Bomba et al.

[11] Patent Number: 5,777,406
[45] Date of Patent: Jul. 7, 1998

[54] CONDUCTOR BAR CONFIGURATION AND ROTOR ASSEMBLY HAVING THE CONDUCTOR BAR CONFIGURATION

[75] Inventors: Ralf Bomba, Recklinghausen; Wilhelm Westendorf, Mülheim/Ruhr, both of Germany

[73] Assignee: Siemens Aktiengesellschaft, Munich, Germany

[21] Appl. No.: 798,608

[22] Filed: Feb. 11, 1997

Related U.S. Application Data

[63] Continuation of PCT/DE95/00992 Jul. 31, 1995.

[30] Foreign Application Priority Data

Aug. 11, 1994 [DE] Germany .................. 44 28 370.9

[51] Int. Cl.$^6$ ...................................................... H02K 3/24
[52] U.S. Cl. .......................... 310/61; 310/211; 310/59; 310/60 A
[58] Field of Search ........................ 310/61, 211, 54, 310/55, 58, 59, 60 R, 60 A, 214, 216

[56] References Cited

U.S. PATENT DOCUMENTS

| 2,755,395 | 7/1956 | Kilner | 310/64 |
|---|---|---|---|
| 2,778,959 | 1/1957 | Kilner | 310/64 |
| 2,786,951 | 3/1957 | Morgan | 310/61 |
| 2,833,944 | 5/1958 | Willyoung | 310/61 |
| 2,864,014 | 12/1958 | Schmitt | 310/61 |
| 3,005,119 | 10/1961 | Schmitt et al. | 310/61 |
| 4,107,560 | 8/1978 | Hallerbaeck | 310/60 R |
| 4,543,503 | 9/1985 | Kaminski et al. | 310/59 |
| 4,634,910 | 1/1987 | Schoellhorn | 310/214 |
| 4,709,177 | 11/1987 | Kaminski | 310/59 |
| 5,329,197 | 7/1994 | Kudlacik | 310/198 |

FOREIGN PATENT DOCUMENTS

| 0 173 877 B1 | 3/1986 | European Pat. Off. | H02K 3/22 |
|---|---|---|---|
| 2 109 936 | 5/1972 | France | H02K 3/22 |
| 1 120 575 | 12/1961 | Germany | H02K 55/01 |
| 54-102503 | 8/1979 | Japan | 310/61 |
| 863921 | 3/1961 | United Kingdom | 310/61 |
| 868467 | 5/1961 | United Kingdom | 310/61 |

OTHER PUBLICATIONS

"Production of Coils in Electric Machines" (Brüderlink et al.), Springer Publishers, Vienna, New York.

*Primary Examiner*—Thomas M. Dougherty
*Assistant Examiner*—B. Mullins
*Attorney, Agent, or Firm*—Herbert L. Lerner; Laurence A. Greenberg

[57] ABSTRACT

A conductor bar configuration includes a multiplicity of conductor bars extending along a longitudinal axis, stacked on one another along a vertical axis and each having four cooling ducts aligned parallel to the longitudinal axis, disposed next to one another in pairs in the direction of a transverse axis perpendicular to the longitudinal axis and to the vertical axis and disposed one behind another in pairs along the longitudinal axis. Each cooling duct has an associated orifice in the vicinity of one end of the configuration and reaches into one of two gas outlet zones disposed approximately in the middle relative to the longitudinal axis, where it merges into an outlet duct directed at an acute angle to the vertical axis. For each pair of cooling ducts situated next to one another in the case of each conductor bar, the orifice of one cooling duct is disposed directly at one end and the orifice of the other cooling duct is spaced from that end. For each pair of cooling ducts disposed one behind another the orifice of one cooling duct is disposed directly at that end to which it leads, and the orifice of the other cooling duct is spaced from that end to which it leads. A rotor assembly includes a multiplicity of identical configurations and is suitable for forming a rotor winding of an electric machine, in particular a turbogenerator. The conductor bars are interconnected by conductor bows disposed at each end and bent approximately in the shape of a circular arc about the longitudinal axis.

9 Claims, 3 Drawing Sheets

CONDUCTOR BAR CONFIGURATION AND ROTOR ASSEMBLY HAVING THE CONDUCTOR BAR CONFIGURATION

CROSS-REFERENCE TO RELATED APPLICATION:

This application is a Continuation of International Application Ser. No. PCT/DE95/00992, filed Jul. 31, 1995.

BACKGROUND OF THE INVENTION

Field of the Invention

The invention relates to a conductor bar configuration including a multiplicity of conductor bars extending along a longitudinal axis and stacked on one another along a vertical axis, each conductor bar having four cooling or ventilating ducts or channels aligned parallel to the longitudinal axis, disposed next to one another in pairs in the direction of a transverse axis perpendicular to the longitudinal axis and to the vertical axis and disposed one behind another in pairs along the longitudinal axis, each of which reaches from an associated orifice in the vicinity of one end of the configuration into one of two gas outlet zones disposed approximately in the middle relative to the longitudinal axis and merges there into an outlet duct directed at an acute angle to the vertical axis. The invention also relates to a rotor assembly having the conductor bar configuration.

In particular, such a configuration can form a component of a rotor winding, rotating about an axis of rotation parallel to the longitudinal axis, in an electric machine, with the rotor winding having a multiplicity of such configurations and with conductor bars that are interconnected in a suitable way. Normally, the rotor winding is mounted in a rotor forging which is cylindrical relative to the axis of rotation and which forms the rotor together with the rotor winding and represents the mechanically bearing part of the rotor. Each configuration is situated in an associated groove of the rotor forging in such a way that the ends project out of the rotor forging. The conductor bars are interconnected outside the rotor forging with parts of the configurations projecting out of the rotor forging and conductor bows connecting the parts forming so-called "winding overhangs".

A rotor winding of an electric machine which is known from U.S. Pat. No. 4,709,177 has curved conductor bars with cooling ducts extending along the conductor bars. Openings in the cooling ducts are disposed at different spacings from the respective rods, in order to obtain a uniform temperature profile at each conductor bar. Such cooling ducts can be developed pairwise in the conductor rod.

Embodiments of rotor windings for electric machines, and embodiments for the configuration mentioned at the outset follow from an article entitled "Läuferwicklungen für Turbogeneratoren und Induktionsmaschinen" [Rotor Windings for Turbogenerators and Induction Machines] by D. Lambrecht in the book entitled "Herstellung der Wicklungen elektrischer Maschinen" [Production of the Windings of Electric Machines], published by H. Sequenz, Springer-Verlag, Vienna and New York 1973, pages 159 to 199. In that paper there is a detailed discussion both of various embodiments for the conductor bars which can be used in the configuration mentioned at the outset having cooling ducts which are situated next to one another in pairs and are intended to conduct a coolant, in particular a gaseous one, and of possibilities for forming a rotor winding from such conductor bars. In that context, reference is made to FIGS. 105, 113 and 118 in relation to examples for such conductor bars, as well as examples for the installation of configurations composed of such conductor bars in grooves, as well as FIG. 129 relating to the production of a rotor winding by interconnecting conductor bars, which are respectively aligned along a longitudinal axis, through the use of conductor bows which are bent about the longitudinal axis and connected to the conductor bars by hard soldering.

Further information relating to a configuration of the type mentioned at the outset and to the use of such a configuration in a rotor of an electric machine follow from European Patent 0 173 877 B1. That document relates to the configuration of the gas outlet zones and the spatial relationship to one another of the two gas outlet zones associated with such a configuration. Those gas outlet zones are intended to be offset with respect to one another along the longitudinal axis of the configuration in such a way that they nowhere overlap one another, that is to say that they are nowhere situated next to one another as seen in the direction of the transverse axis.

An important theme in the construction of a configuration of the type mentioned at the outset as a component of a rotor winding of an electric machine is the distribution of the temperature which is set up along the longitudinal axis during operation of the rotor winding, that is to say while electric current and coolant are flowing through the configuration. It is particularly important in that case to achieve a temperature distribution with a temperature which is as constant as possible along the longitudinal axis or, in view of the absorption of heat, rises as uniformly and gradually as possible, since in that way the loadability of the configuration, which is determined by the maximum temperature along the configuration, is highest. The maximum loadability is determined by the maximum temperature along the configuration, since that maximum is not permitted to exceed a certain limiting value which can be determined, for example, as the highest permissible temperature of an insulating material that is inserted between the conductor bars and/or sheaths the configuration. If both that limiting value and the dimensions of the configuration are fixed, it is possible to achieve an increase in the roadability by avoiding so-called "hot spots", that is to say spots where the temperature is substantially higher by comparison with their surroundings, something which is equivalent to uniformly generating and dissipating heat over the configuration. The particularly high loadability of such a configuration follows from the fact that during operation its temperature can be increased in such a way that the permissible limiting value is reached in the course of a uniform rise along the configuration, not only at isolated hot spots.

SUMMARY OF THE INVENTION

It is accordingly an object of the invention to provide a conductor bar configuration and a rotor assembly having the conductor bar configuration, which overcome the hereinaforementioned disadvantages of the heretofore-known devices of this general type and which meet the requirements just outlined above in a particular way.

With the foregoing and other objects in view there is provided, in accordance with the invention, a conductor bar configuration, comprising a longitudinal axis, a vertical axis, and a transverse axis perpendicular to the longitudinal axis and to the vertical axis; ends having orifices in vicinity thereof; two gas outlet zones disposed approximately centrally relative to the longitudinal axis, the gas outlet zones having an outlet duct directed at an acute angle relative to the vertical axis; a multiplicity of conductor bars extended along the longitudinal axis and stacked on one another along the vertical axis; each of the conductor bars having four cooling ducts aligned parallel to the longitudinal axis, disposed next to one another in pairs in direction of the transverse axis and disposed one behind another in pairs along the longitudinal axis; each of the cooling ducts reaching from an associated one of the orifices into one of the gas outlet zones and merging at the one gas outlet zone into the outlet duct; the orifice of one of the cooling ducts disposed directly at one of the ends and the orifice of the other of the cooling ducts spaced from the one end, for each pair of the cooling ducts disposed next to one another in each of the conductor bars; and the orifice of one of the cooling ducts disposed directly at the end to which it leads and the orifice of the other of the cooling ducts spaced from the end to which it leads, for each pair of the cooling ducts disposed one behind another in each of the conductor bars.

The invention is based on the finding that in the case of a given and largely uniform generation of heat along the configuration, as is the case during operation within the framework of a rotor winding, it is possible to achieve a uniform dissipation of heat required to attain a uniform distribution of temperature by matching the dimensions of the cooling ducts to one another, with unnecessarily long cooling ducts, in particular, being avoided. One factor in this case is that the cooling of a rotor winding in the interior of the rotor forging is subject to somewhat different presuppositions than the cooling of the rotor winding outside the rotor forging, that is to say in a winding overhang. In a winding overhang, the rotor winding is in no way as enclosed as in the rotor forging, with the result that it is possible for the purpose of cooling the winding with the aid of a coolant which flows through the cooling ducts to make compromises that bring about improved cooling of the winding in the interior of the rotor forging. Consequently, not all of the cooling ducts in the configuration according to the invention reach completely through the configuration, but only half of the cooling ducts actually begin at an orifice at one end of the configuration, and the other half of the cooling ducts begin respectively at an orifice which is clearly spaced from that end in the vicinity of which they are located. A loss in cooling thereby produced in the region of the winding overhangs can be accepted, because it can be compensated by other cooling measures which are known per se from the prior art and require no further explanation at this juncture. The essential advantage resides in that excessively long cooling ducts having a consequently limited hydraulic conductance for the coolant are avoided.

In accordance with another feature of the invention, for each pair of cooling ducts situated one behind another, the cooling ducts are approximately of the same length. This has the direct result that the conductances of these cooling ducts, and thus the conductances of all four cooling ducts of a conductor bar, are equal. A particularly uniform cooling of the conductor bar through all four cooling ducts is thus ensured and the production of "hot spots" is prevented particularly effectively.

In accordance with a further feature of the invention, the configuration of the orifices of the cooling ducts according to the invention implies that the gas outlet zones in which the cooling ducts lead out of the configuration through outlet ducts are mutually offset along the longitudinal axis. However, this offset is preferably not taken so far that the gas outlet zones are nowhere situated next to one another, but the construction of the cooling ducts is such that the gas outlet zones are partially situated next to one another relative to the transverse axis, preferably over a section which corresponds to the length of a gas outlet zone by up to 25%, and preferable only up to 15%, for example by 2 of 14 outlet ducts per gas outlet zone.

With the objects of the invention in view there is also provided a rotor assembly, comprising a rotor forging having a groove formed therein, the conductor bar configuration being inserted into the groove, and the ends projecting far enough out of the rotor forging to expose all of the orifices.

In accordance with another feature of the invention, those orifices which are not situated directly at a respective end are situated directly at the rotor forging.

With the objects of the invention in view there is additionally provided a rotor assembly, comprising a rotor forging having grooves formed therein, and a multiplicity of identical conductor bar configurations each inserted into a respective one of the grooves, the ends projecting far enough out of the rotor forging to expose all of the orifices, and conductor bows each disposed at a respective one of the ends, defined by the corresponding ends of the configurations, the conductor bows being bent approximately in the shape of a circular arc about the longitudinal axis, and each interconnecting two of the conductor bars belonging to mutually differing configurations.

In accordance with another feature of the invention, the conductor bows are connected to the conductor bars by hard soldering.

In accordance with a concomitant feature of the invention, the configuration is integrated, accompanied by the formation of so-called "rectangular winding overhangs" into a rotor winding of a large electric machine, in particular a turbogenerator.

A rectangular winding overhang is formed by connecting, in particular hard soldering, conductor bars which are aligned along the axis of rotation of the rotor to be produced to conductor bows which are bent approximately in the shape of a circular arc about the axis of rotation. This embodiment is known per se, but to date it has often not been preferred over a construction in which the conductor bars aligned along the axis of rotation have been appropriately bent away in order to form a winding overhang. However, the provision of a rectangular winding overhang within the scope of the invention has the further advantage of making it possible to ensure cooling of the conductor bows separately and independently of the cooling of the conductor bars, and this offers an additional degree of freedom in constructing the rotor winding.

Other features which are considered as characteristic for the invention are set forth in the appended claims.

Although the invention is illustrated and described herein as embodied in a conductor bar configuration and a rotor assembly having the conductor bar configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
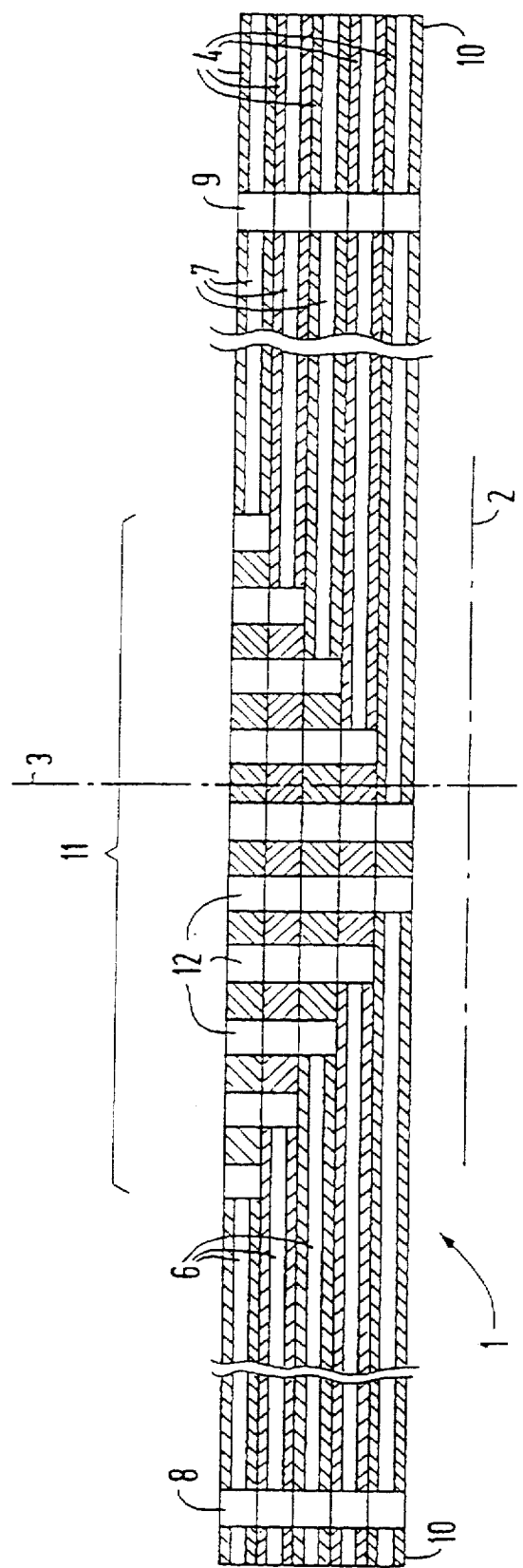
FIG. 1 is a diagrammatic, sectional view of a configuration having a multiplicity of conductor bars according to the invention.
Figure 2:
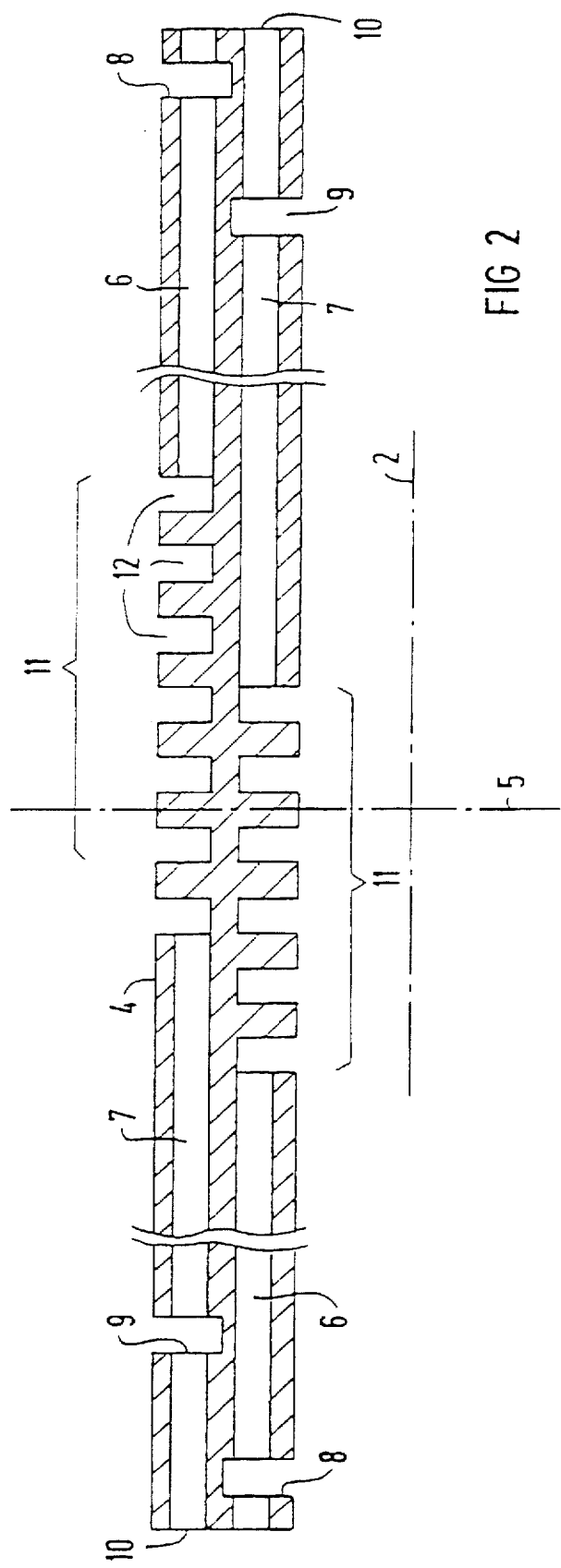
FIG. 2 is a sectional view of a conductor bar of FIG. 1.

Referring now in detail to the figures of the drawings in which exemplary embodiments of the invention are illustrated in such a way as to be partly diagrammatic and/or distorted and not true to scale in order to illustrate specific features of the invention, it is noted that FIGS. 1 and 2 thereof are to be regarded as belonging together and will be explained jointly. FIG. 1 shows a section through a configuration 1 according to the invention, which is shown parallel to a longitudinal axis 2 and a vertical axis 3, along which the conductor bars 4 are stacked on one another. FIG. 2 shows a section which is positioned perpendicular to the section according to FIG. 1 and is taken through a middle conductor bar 4 of the configuration 1 that is recognizable from FIG. 1. The section is positioned parallel to the longitudinal axis 2 and to a transverse axis 5 that is both perpendicular to the longitudinal axis 2 and perpendicular to the vertical axis 3.

In the configuration 1, each conductor bar 4 has four cooling or ventilating ducts or channels 6, 7, of which two cooling ducts 6 have orifices 8 in the vicinity of one end 10 and two cooling ducts 7 have an orifice 9 which is spaced from the respective end 10 into which the cooling duct 7 runs. A cooling duct 6 and a cooling duct 7 are situated respectively one behind another relative to the longitudinal axis 2, or respectively next to one another relative to the transverse axis 5. All of the cooling ducts 6, 7 end in gas outlet zones 11 in the region of the middle of the configuration 1, which is indicated by the vertical axis 3 and the transverse axis 5, where they merge into outlet ducts directed parallel to the vertical axis 3.

During operation, coolant, in particular cooling gas, penetrates through the orifices 8 and 9 into the respective cooling ducts 6 and 7 and passes therein to outlet ducts 12 in the gas outlet zones 11. As is seen along the longitudinal axis 2, the gas outlet zones 11 are mutually offset, and as is seen along the transverse axis 5, they are partially situated next to one another. Both recesses of the conductor bars 4 which form the orifices 8 and 9 and recesses of the conductor bars 4 which form the outlet ducts 12, are formed in the present example as lateral milled recesses. Of course, other embodiments are entirely possible.

Figure 3:
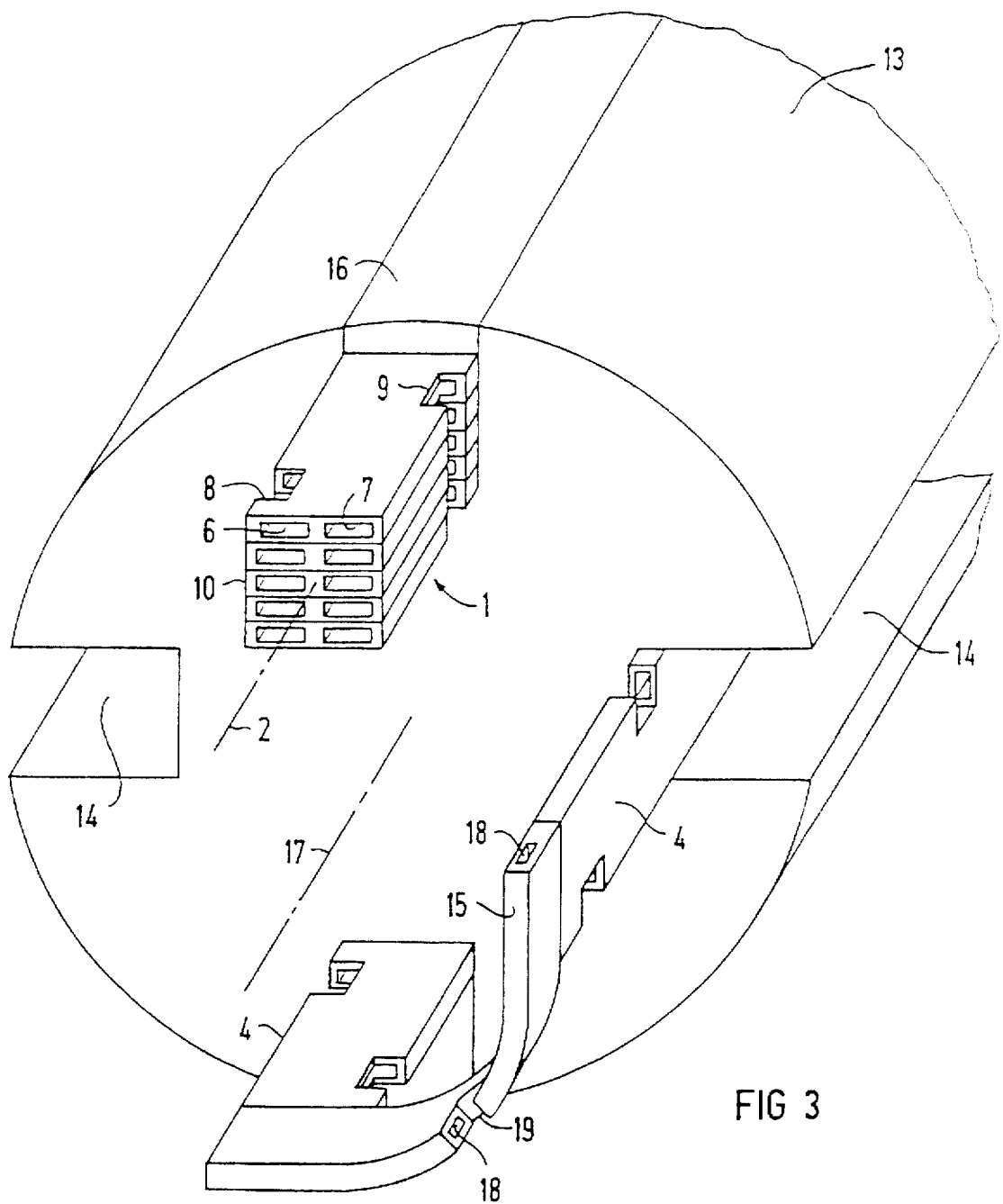
FIG. 3 is a fragmentary, perspective view of a rotor forging with configurations according to the invention.

FIG. 3 is an oblique view relative to an axis 17, which shows how the configurations 1 of the conductor bars 4 are disposed in grooves 14 of a rotor forging 13 in order to form a rotor winding for an electric machine. The conductor bars 4 project out of the rotor forging 13 in such a way that all of the orifices 8 and 9 are exposed. The orifices 9 that are spaced from the ends 10 in this case are located directly at the rotor forging 13. In order to form a rotor winding, in particular a winding overhang as it is indicated in the lower part of FIG. 3, the conductor bars 4 must be interconnected. This is performed by using conductor bows 15 which are bent approximately in the shape of a circular arc about the axis of rotation 17, which is the axis of the rotor forging 13 and is parallel to the longitudinal axis 2. The conductor bows 15 respectively interconnect two conductor bars 4. This connection may be a hard-soldered connection, for example. Cooling ducts 18 for cooling the conductor bow 15 are shown. The cooling ducts 18 begin on one respective conductor bar 4 and end in a recess 19 disposed in the middle. Since the conductor bars 4 are exposed to substantial centrifugal forces during operation, the grooves 14 must be reliably sealed. This is indicated diagrammatically by a groove closure 16 which in practice must, of course, form a highly loadable force closure with the rotor forging 13 in order to absorb the centrifugal forces.

The configurations according to the invention having a multiplicity of conductor bars is distinguished by a particularly uniform dissipation of the heat produced during operation when the electric current flows through the conductor bars, and are therefore suitable in particular for incorporation into a highly loadable rotor winding for an electric machine, in particular a turbogenerator.

We claim:

1. A conductor bar configuration, comprising:

a longitudinal axis, a vertical axis, and a transverse axis perpendicular to the longitudinal axis and to the vertical axis;

ends having orifices in vicinity thereof;

two gas outlet zones disposed approximately centrally relative to the longitudinal axis, said gas outlet zones having an outlet duct directed at an acute angle relative to the vertical axis;

a multiplicity of conductor bars extended along the longitudinal axis and stacked on one another along the vertical axis;

each of said conductor bars having four cooling ducts aligned parallel to the longitudinal axis, disposed next to one another in pairs in direction of the transverse axis and disposed one behind another in pairs along the longitudinal axis;

each of said cooling ducts reaching from an associated one of said orifices into one of said gas outlet zones and merging at said one gas outlet zone into said outlet duct;

said orifice of one of said cooling ducts disposed directly at one of said ends and said orifice of the other of said cooling ducts spaced from said one end, for each pair of said cooling ducts disposed next to one another in each of said conductor bars; and said orifice of one of said cooling ducts disposed directly at said end to which it leads and said orifice of the other of said cooling ducts spaced from said end to which it leads, for each pair of said cooling ducts disposed one behind another in each of said conductor bars.

2. The conductor bar configuration according to claim 1, wherein said cooling ducts of each pair of said cooling ducts disposed one behind another are approximately of the same length.

3. The conductor bar configuration according to claim 1, wherein said gas outlet zones are mutually offset along the longitudinal axis and partially disposed next to one another relative to the transverse axis.

4. A rotor assembly, comprising:

a rotor forging having a groove formed therein; and a conductor bar configuration inserted into said groove, said conductor bar configuration including:

a longitudinal axis, a vertical axis, and a transverse axis perpendicular to the longitudinal axis and to the vertical axis;

ends having orifices in vicinity thereof, said ends projecting far enough out of said rotor forging to expose all of said orifices;

two gas outlet zones disposed approximately centrally relative to the longitudinal axis, said gas outlet zones having an outlet duct directed at an acute angle relative to the vertical axis;

a multiplicity of conductor bars extended along the longitudinal axis and stacked on one another along the vertical axis;

each of said conductor bars having four cooling ducts aligned parallel to the longitudinal axis, disposed next to one another in pairs in direction of the transverse axis and disposed one behind another in pairs along the longitudinal axis;

each of said cooling ducts reaching from an associated one of said orifices into one of said gas outlet zones and merging at said one gas outlet zone into said outlet duct;

said orifice of one of said cooling ducts disposed directly at one of said ends and said orifice of the other of said cooling ducts spaced from said one end, for each pair of said cooling ducts disposed next to one another in each of said conductor bars; and said orifice of one of said cooling ducts disposed directly at said end to which it leads and said orifice of the other of said cooling ducts spaced from said end to which it leads, for each pair of said cooling ducts disposed one behind another in each of said conductor bars.

5. The rotor assembly according to claim 4, wherein said orifices not disposed directly at a respective one of said ends are disposed directly at said rotor forging.

6. A rotor assembly, comprising:

a rotor forging having grooves formed therein; and a multiplicity of identical conductor bar configurations each inserted into a respective one of said grooves, each of said conductor bar configurations including:

a longitudinal axis, a vertical axis, and a transverse axis perpendicular to the longitudinal axis and to the vertical axis;

ends having orifices in vicinity thereof, said ends projecting far enough out of said rotor forging to expose all of said orifices;

two gas outlet zones disposed approximately centrally relative to the longitudinal axis, said gas outlet zones having an outlet duct directed at an acute angle relative to the vertical axis;

a multiplicity of conductor bars extended along the longitudinal axis and stacked on one another along the vertical axis;

each of said conductor bars having four cooling ducts aligned parallel to the longitudinal axis, disposed next to one another in pairs in direction of the transverse axis and disposed one behind another in pairs along the longitudinal axis;

each of said cooling ducts reaching from an associated one of said orifices into one of said gas outlet zones and merging at said one gas outlet zone into said outlet duct;

said orifice of one of said cooling ducts disposed directly at one of said ends and said orifice of the other of said cooling ducts spaced from said one end, for each pair of said cooling ducts disposed next to one another in each of said conductor bars; and said orifice of one of said cooling ducts disposed directly at said end to which it leads and said orifice of the other of said cooling ducts spaced from said end to which it leads, for each pair of said cooling ducts disposed one behind another in each of said conductor bars; and conductor bows each disposed at a respective one of said ends, bent approximately in the shape of a circular arc about the longitudinal axis, and each interconnecting two of said conductor bars of different configurations.

7. The rotor assembly according to claim 6, wherein said conductor bows are hard-soldered to said conductor bars.

8. The rotor assembly according to claim 6, wherein said rotor forging is part of a rotor winding of a large electric machine.

9. The rotor assembly according to claim 6, wherein said rotor forging is part of a rotor winding of a turbogenerator.

* * * * *